United States Patent [19]

Schoen

[11] Patent Number: 4,867,534
[45] Date of Patent: Sep. 19, 1989

[54] MULTIPLE APERTURE LASER SYSTEM

[75] Inventor: Neil C. Schoen, Irvine, Calif.

[73] Assignee: TRW Inc., Redondo Beach, Calif.

[21] Appl. No.: 223,728

[22] Filed: Jul. 5, 1988

Related U.S. Application Data

[63] Continuation of Ser. No. 928,143, Nov. 7, 1986, abandoned, which is a continuation of Ser. No. 596,744, Apr. 4, 1984, abandoned.

[51] Int. Cl.$^4$ .................. G02B 27/00; G02B 27/42; H01S 3/10
[52] U.S. Cl. ................ 350/319; 350/162.11; 372/103
[58] Field of Search .......... 350/319, 62.11, 162.16; 372/103, 99, 33, 34

[56] References Cited

U.S. PATENT DOCUMENTS

| | | | |
|---|---|---|---|
| 3,894,795 | 7/1975 | Laurens | 372/33 |
| 3,935,545 | 1/1976 | Campillo et al. | 350/319 |
| 3,980,397 | 9/1976 | Judd et al. | 350/162.11 |
| 4,390,994 | 6/1983 | Roberts et al. | 372/103 |

FOREIGN PATENT DOCUMENTS 2411422  7/1979  France ..................... 350/162.11

OTHER PUBLICATIONS

"Enhanced Focal-Plane Irradiance in the Presence of Thermal Blooming", C. Yeh et al., *Applied Optics*, vol. 15, No. 11, Nov. 1976, pp. 2913–2916.

V. R. Costich et al., "Apertures to Shape High Power Beams", *Laser Focus*, vol. 10, No. 9, pp. 43–46, Sep. 1974.

E. W. S. Hee, "Fabrication of Apodized Apertures ...", *Optics & Laser Tech.*, vol. 17, No. 2, Apr. 1975, pp. 75–79.

*Primary Examiner*—Jon W. Henry
*Attorney, Agent, or Firm*—Noel F. Heal; Benjamin DeWitt

[57] ABSTRACT

A high-energy laser construction for minimizing the effects of thermal blooming on laser beams passing through the atmosphere. The construction includes multiple subapertures of equivalent area to a single aperture, but spatially separated to maintain a relatively low energy density, and therefore low probability of thermal blooming, until sub-beams emanating from the subaperture converge and overlap near a target plane.

2 Claims, 1 Drawing Sheet

MULTIPLE APERTURE LASER SYSTEM

This application is a continuation of Ser. No. 928,143, filed Nov. 7, 1986, now abandoned, which is a continuation of Ser. No. 596,744, filed Apr. 4, 1984, now abandoned.

BACKGROUND OF THE INVENTION

This invention relates generally to high-power laser systems, and more particularly, to optical systems for alleviating the effects of atmospheric conditions on high-power laser beams. When a high-power laser beam is propagated through the atmosphere, its coherency, and therefore its power, are degraded by a number of uncontrollable atmospheric effects. One of the most significant effects is thermal blooming, which occurs when the beam energy is non-uniformly absorbed by components of the atmosphere, such as water vapor. This absorption process gives rise to density distortions in the atmosphere, and a planar wavefront propagated from a laser can then be subject to substantial aberrations. Wavefront distortion greatly reduces the peak power of the beam, and although various approaches have been suggested to alleviate the problem, none is completely satisfactory.

One of the simplest approaches is to increase the diameter of the exit aperture through which the beam is propagated. Studies have indicated that the use of large exit apertures diminishes the effects of thermal blooming. However, the use of large apertures, in excess of one meter in diameter, has some practical limitations, such as high fabrication cost and thermomechanical stability of the components.

Another technique for reducing the effects of thermal blooming is to employ principles of adaptive optics. Light reflected from a target on which the beam impinges is analyzed to determine the profile of wavefronts after atmospheric distortion. Then a deformable mirror can be employed to apply compensating distortions to the transmitted wavefronts. This process of wavefront reconstruction is technically complex and expensive. More importantly, the technique works well only in the correction of distortions that occur relatively close to the source of the beam. When atmospheric distortions occur at relatively long distances from the source, the adaptive technique is less successful.

It will be appreciated from the foregoing that there is a need for a simpler technique to reduce the effects of thermal blooming on high-power laser beams. The present invention is directed to this end.

SUMMARY OF THE INVENTION

The present invention resides in a multiple-aperture structure for the transmission of a laser beam through the atmosphere. Briefly, and in general terms, the structure of the invention includes a plurality of laser exit subapertures arrayed in a spaced relationship within a single virtual exit aperture. The subapertures are spaced apart sufficiently to prevent resultant sub-beams from converging until an intended target plane is closely approached. In this manner, the energy density of the laser radiation is kept low enough to minimize thermal blooming except in a region close to the target plane.

Although the optimum spacing of the subapertures will depend on a variety of factors, a spacing of approximately one beam diameter is presently preferred. A variety of subaperture array patterns will produce desirable results. If a circular array is used, the subapertures should be arrayed around the periphery of a circle. If one or more subapertures are included toward the center of the circle, beam overlap occurs at a point closer to the beam source, and peak power levels are then significantly reduced by thermal blooming.

One of the most important aspects of the invention lies in the recognition that there is a significant improvement in beam power even if the manufacturing and alignment tolerances of the individual subapertures are not controlled sufficiently to maintain a perfect wavefront profile for the beam. For a diffraction-limited beam, in a vacuum, the peak irradiance of the beam at the target plane is proportional to the square of the exit aperture radius. If multiple subapertures are used to transmit the same power, not only must the subapertures have the same total area as the original single aperture, but the phase angles of the sub-beams must be as near to identical as possible. However, if the beams are subject to a phase-aberrating environment, the peak irradiance varies more linearly with beam radius. Multiple sub-beams, even though incoherent, may then provide a higher peak irradiance than a single beam of the same area.

It will be appreciated from the foregoing that the present invention represents a significant improvement in the field of high-power laser systems. In particular, the invention provides a higher peak power at an intended target plane, without the need for complex and expensive wavefront reconstruction techniques to reduce the effects of thermal blooming. Other aspects and advantages of the invention will become apparent from the following more detailed description, taken in conjunction with the accompanying drawings.

DESCRIPTION OF THE PREFERRED EMBODIMENT

The present invention is concerned with techniques for minimizing the effects of thermal blooming on high-energy laser beams. Thermal blooming occurs when a beam of sufficient energy intensity encounters the atmosphere and is non-uniformly absorbed, producing density fluctuations that distort the otherwise planar wavefront of the beam. Wavefront distortion can be corrected by means of adaptive optical systems that detect a return beam reflected from a target, and use phase information in the return beam to reconstruct the transmitted wavefronts to compensate for atmospheric effects. The technique is complex, expensive, and not satisfactory for atmospheric effects occurring some distance from the laser beam source. Another solution is increase the diameter of the transmitted beam to provide sufficient additional power to compensate for the losses. However, the fabrication and alignment of large mirrors for this purpose has significant practical limitations.

In accordance with the invention, multiple sub-beams are transmitted from multiple subapertures disposed on an array making up a single virtual aperture. The subapertures are spaced apart sufficiently to prevent the sub-beams from converging until the target plane is closely approached, and the subapertures are not aligned accurately enough to provide phase coherence among them.

Figure 1:
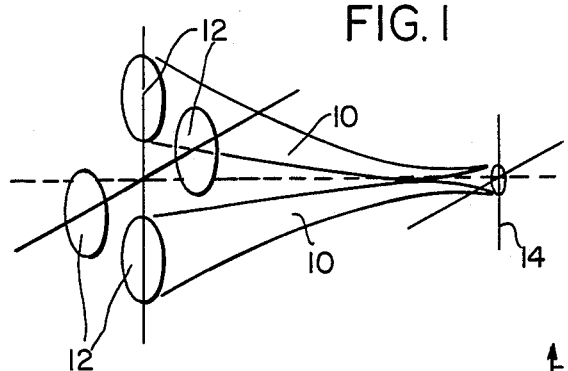
FIG. 1 is a schematic view of a laser system in accordance with the invention, having four subapertures.

FIG. 1 shows the concept of the invention in schematic form. A plurality of sub-beams, indicated by reference numeral 10, emanate from a corresponding number of subapertures 12 that are spaced apart in an array. The sub-beams 10 emerge from the subapertures 12 in a spaced relationship, and maintain that relationship over most of the distance to a target plane 14. Since the energy intensity in any one of the sub-beams is only a fraction of that in a single beam of the same total power, the effects of thermal blooming are considerably reduced over most of the distance to the target plane 14. Some blooming inevitably occurs after the sub-beams have converged into an overlapping relationship, but the total effect of blooming is considerably reduced.

Ideally, the subapertures 12 are formed in the same shape as sub-elements of a large virtual aperture of which they are a part. If the aperture is spherical in curvature, each of the subapertures should ideally be formed as a part-spherical surface. For maximum power at the target plane 14, the subapertures 12 should also be fabricated and aligned to provide near-perfect phase coherence from one subaperture to another. However, it can be shown that considerable advantage can still be obtained from the technique of the invention if perfect phase coherence is not maintained. The basis for this rather surprising conclusion can best be appreciated from a consideration of FIGS. 2a and 2b.

Figure 2A:
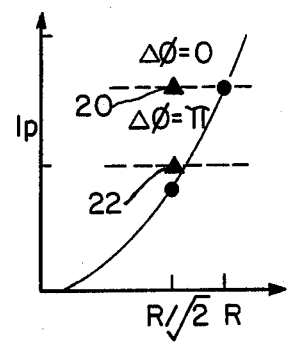
FIGS. 2a and 2b are related graphs showing the variation of peak irradiance level with aperture radius, comparing the diffraction-limited case (FIG. 2a) with the aberrating environment case (FIG. 2b)

As shown in FIG. 2a, for a diffraction-limited beam, the peak irradiance varies as the square of the beam radius. Thus, for a single aperture of radius R the peak irradiance is double that of a single aperture of radius $R/2^{\frac{1}{2}}$. The irradiance resulting from two subapertures of equivalent area to a single aperture of radius R, is indicated by the two solid triangles 20 and 22. The upper triangle 20 indicates an irradiance level equivalent to the single-aperture case, and is obtained when the two subapertures are precisely in phase. The lower triangle 22 indicates a reduced irradiance level, down to about sixty percent, when the wavefronts from the two subapertures are 180° out of phase. It is quite apparent from FIG. 2a that there is no advantage to the use of subapertures of equivalent area if the beam is an ideal diffraction-limited one.

Figure 2B:
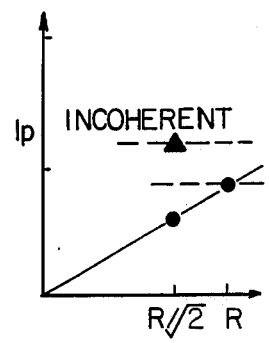

The situation is different, however, if the beam is subject to an environment that induces phase aberrations. Then the peak irradiance level varies in a practically linear fashion with respect to the beam radius, as shown in FIG. 2b. A multi-aperture system of the same area as the single-aperture in this case has a peak irradiance greater than that of the single aperture system. Moreover, this advantage is obtained even though there is no phase coherency between the subapertures.

Figure 3:
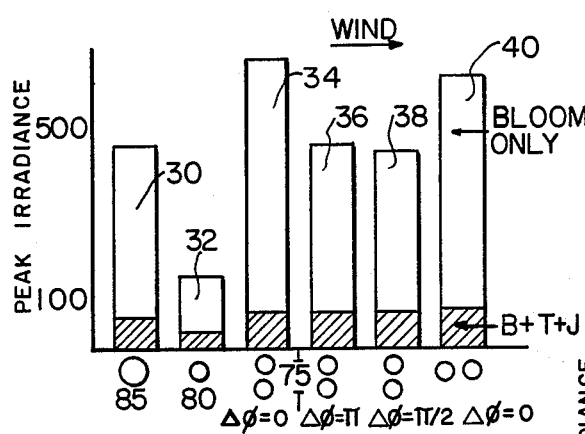
FIG. 3 is a graphical comparison of dual-aperature and single-aperture peak irradiance levels.

FIG. 3 is a bar chart comparing the peak irradiance levels for various single-aperture and dual-aperture systems. The upper level on each bar of the chart represents the peak irradiance after thermal blooming is taken into account. The top of the shaded area of each bar of the chart represents the irradiance level after blooming and other sources of aberration are taken into account. Specifically, the shaded portions of the bar chart include the effects of thermal blooming, atmospheric turbulence, and mechanical jitter of the optical components. The results of FIG. 3 were obtained from computer simulations for which typical values were assumed for the parameters affecting the results. Specifically, the following parameters were assumed:

| Range | 4–5 km. |
|---|---|
| Absorption Coeff. | $1 \times 10^6 \, cm^{-1}$ |
| Turbulence | $1 \times 10^{-15} \, cm^{-\frac{2}{3}}$ |
| Power | 0.5–7.5 × critical power |
| Wind speed | 2 m/sec |
| Jitter | 1.5λ/D |
| Wavelength | 3.8 microns |
| Grid size | 64 × 64 |
| Number of phase screens | 105 |

Vertical bars 30 and 32 in FIG. 3 show the performance of single apertures of two sizes. Bar 34 shows the improvement in peak irradiance that is obtained from the use of two subapertures maintained in perfect phase relationship. Bar 36 indicates the irradiance levels when the two subapertures are 180° out of phase. When no attempt is made to control the phase at the subapertures, the results will fall somewhere between those of bars 34 and 36, and still constitute a substantial improvement over the single-aperture case 30.

Bar 38 indicates the peak irradiation levels for phase differences of 90°, and bar 40 is equivalent to bar 34 except for the orientation of the subapertures with respect to the wind direction. Although little difference can be seen in the peak irradiance levels for the two wind conditions, the condition shown unders bars 34 and 36, with wind normal to the center-to-center axis of the two subapertures, is the more favorable one from an energy distribution standpoint. In other words, if one considers a contour within which a selected percentage of radiation will fall in the target plane, the wind condition shown at 34 and 36 results in a smaller contour of this type, and therefore a higher energy density.

Figure 4:
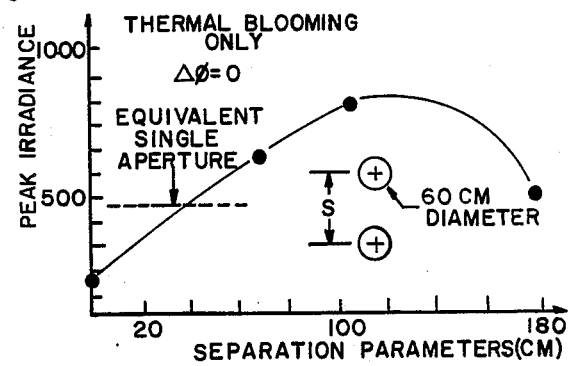
FIG. 4 is a graph showing the variation of peak irradiance with subaperture spacing.

The advantages of the invention can be obtained over a wide range of conditions and configurations. Probably one of the most important parameters is the spacing between adjacent subapertures. FIG. 4 shows the results of an experiment in which peak irradiance was measured for various subaperture spacings in a dual-aperture system operating in a perfectly in-phase condition, and with thermal blooming considered to be the only atmospheric effect. For subapertures of 60 cm diameter, it will be seen that the center-to-center spacing yielding the maximum peak irradiance is approximately 120 cm. In other words, the optimum spacing between the subapertures is approximately 60 cm, or one diameter.

No attempt has been made to optimize the subaperture array configuration, but some general observations can be made from the information available. One observation is that, in a circular array, it is best not to "fill in" the central area of the array. An experiment conducted using four subapertures spaced about the periphery of a circle yielded good results, along the same lines as the dual aperture system discussed in relation to FIG. 3. In fact, the four subapertures did not provide a significant improvement over the dual aperture system. However, the insertion of a fifth subaperture in the center of the array caused the system to behave in a manner comparable to a single-aperture system of equivalent area.

This is consistent with the underlying theory and object of the invention, which is to maintain sub-beam separation as long as possible. The presence of a central beam will, of course, result in sub-beam overlap at a position closer to the beam source. This does not necessarily rule out linear arrays of subapertures as practical embodiments of the invention.

Another variant of the invention is to provide sub-beams from independent apertures, i.e., not part of a single virtual aperture, but each with its own optical axis. Since it is not necessary to preserve phase coherency from subaperture to subaperture, there is probably no need to conform the subaperture mirror surfaces to a single spherical contour. The same advantage of a considerably reduced thermal blooming effect would apply to configurations of separately structured subapertures.

It will be appreciated from the foregoing that the present invention represents a significant improvement in the field of high-energy laser systems. In particular, the invention provides for reduced thermal blooming effects without the need for complex and costly wavefront reconstruction techniques, and without the cost and difficulty of fabricating very large aperture mirrors. In addition, the use of multiple subapertures inherently increases the reliability and ease of maintenance of the system. Finally, the multiple subaperture system has the potentiality of being employable to direct multiple beams to multiple targets, with appropriate control apparatus.

It will also be appreciated that, although a specific embodiment of the invention has been described in detail for purposes of illustration, various modifications may be made without departing from the spirit and scope of the invention. Accordingly, the invention is not to be limited except as by the appended claims.

I claim:

1. A high-energy laser system providing resistance to thermal blooming, the system comprising:

means for producing a plurality (n) of high-energy laser sub-beams of substantially equal wavelength but not maintained in phase coherence, the sub-beams being emitted from an equal plurality (n) of laser exit subapertures arrayed in a spaced relationship;

wherein the sub-beams are aligned in such a manner as to converge at a target plane, and the sub-apertures are spaced apart sufficiently to prevent the resultant sub-beams from overlapping except in a region close to the target plane;

and wherein the subapertures are substantially circular in cross section and the spacing between adjacent subapertures is approximately one sub-beam diameter measured at the location of the subapertures.

2. A laser system as set forth in claim 1, wherein:

the subapertures are centered on the circumference of a circle having a radius of approximately twice the radius of each subaperture.

* * * * *